United States Patent
Gamaley et al.

(10) Patent No.: US 9,294,372 B2
(45) Date of Patent: *Mar. 22, 2016

(54) STATUS DETERMINATION IN COMPUTER NETWORK-BASED COMMUNICATIONS SYSTEM

(71) Applicant: International Business Machines Corporation, Armonk, NY (US)

(72) Inventors: Vladimir Gamaley, Rehovot (IL); Gili Nachum, Bet-shemesh (IL); Gil Perzy, Holon (IL)

(73) Assignee: International Business Machines Corporation, Armonk, NY (US)

( * ) Notice: Subject to any disclaimer, the term of this patent is extended or adjusted under 35 U.S.C. 154(b) by 393 days.

This patent is subject to a terminal disclaimer.

(21) Appl. No.: 13/874,475

(22) Filed: Apr. 30, 2013

(65) Prior Publication Data

US 2013/0254388 A1 Sep. 26, 2013

Related U.S. Application Data

(63) Continuation of application No. 13/116,926, filed on May 26, 2011, now Pat. No. 8,661,108.

(51) Int. Cl.
*H04L 29/08* (2006.01)
*H04L 12/26* (2006.01)
*G06Q 10/10* (2012.01)

(52) U.S. Cl.
CPC ............... *H04L 43/08* (2013.01); *G06Q 10/10* (2013.01); *H04L 67/24* (2013.01)

(58) Field of Classification Search
CPC .......... G06Q 10/10; H04L 43/08; H04L 67/24
See application file for complete search history.

(56) References Cited

U.S. PATENT DOCUMENTS

| | | | |
|---|---|---|---|
| 6,807,423 B1 | 10/2004 | Armstrong et al. |
| 7,065,185 B1 | 6/2006 | Koch |
| 2004/0003042 A1 | 1/2004 | Horovitz et al. |
| 2005/0266859 A1 | 12/2005 | Tejani et al. |
| 2007/0026882 A1 | 2/2007 | Harris et al. |
| 2007/0130259 A1 | 6/2007 | Daniell et al. |
| 2009/0010163 A1 | 1/2009 | Isomura et al. |
| 2009/0063676 A1 | 3/2009 | Oh et al. |
| 2009/0119400 A1 | 5/2009 | Fukazawa |

FOREIGN PATENT DOCUMENTS

| | | |
|---|---|---|
| JP | 2003233575 | 8/2003 |
| WO | 2005094043 | 10/2005 |
| WO | 2007113429 | 10/2007 |

*Primary Examiner* — Andrew Lai
*Assistant Examiner* — M Mostazir Rahman
(74) *Attorney, Agent, or Firm* — North Shore Patents, P.C.; Michele Liu Baillie

(57) ABSTRACT

A method for determining a status of a presentity by determining a success rate for a plurality of transactions of the same transaction type that are initiated by at least one entity in a first computer network-based communications system in a plurality of corresponding transaction requests, where the transactions relate to a presentity, identifying a status descriptor that has a predefined association with the transaction type, identifying a condition that has a predefined association with the status descriptor and the transaction type, and associating the status descriptor with the presentity if the success rate meets the condition.

3 Claims, 7 Drawing Sheets

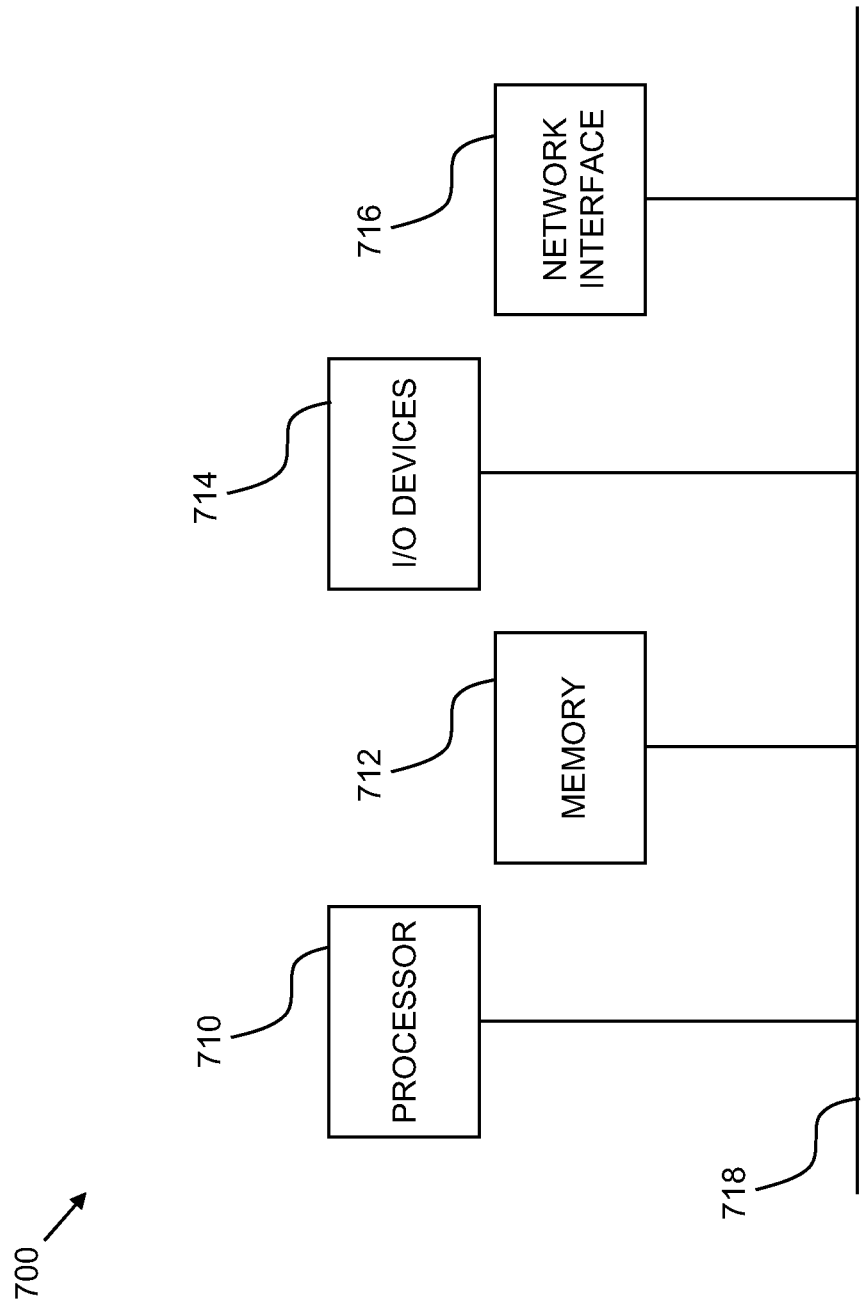

STATUS DETERMINATION IN COMPUTER NETWORK-BASED COMMUNICATIONS SYSTEM

CROSS-REFERENCE TO RELATED APPLICATIONS

The present application is a continuation of co-pending U.S. patent application Ser. No. 13/116,926, filed on May 26, 2011.

FIELD OF THE INVENTION

The invention relates to computer network-based communications in general, and in particular to real-time collaboration systems.

BACKGROUND OF THE INVENTION

Computer network-based communications systems, such as real-time collaboration systems or instant messaging systems, are increasingly used within and between businesses and other organizations to enhance communications and cooperation between parties. Typically, before two parties can communicate with each other, each party must provide his or her collaboration system with an identifier that the collaboration system uses to identify the other party. Common examples of such identifiers include email addresses and collaboration system-specific user IDs, which are typically maintained in contact lists. Collaboration systems typically provide their users with the current status of each of the contacts in their contact lists, such as indicating whether or not a contact is currently logged-in to his/her collaboration system and available to receive communications. The status of a user of a collaboration system is typically set by the user or by the collaboration system itself. Some collaboration systems provide gateways that allow their users to communicate with and receive the status of their contacts who belong to other collaboration systems. However, as different types of collaboration systems may use different status descriptors, or may use the same status descriptor to mean different things, a user of one type of collaboration system might misinterpret the statuses of the user's contacts who belong to other collaboration systems.

SUMMARY OF THE INVENTION

In one aspect of the invention a method is provided for determining the status of a presentity, by determining a success rate for a plurality of transactions of the same transaction type that are initiated by at least one entity in a first computer network-based communications system in a plurality of corresponding transaction requests, where the transactions relate to a presentity, identifying a status descriptor that has a predefined association with the transaction type, identifying a condition that has a predefined association with the status descriptor and the transaction type, and associating the status descriptor with the presentity if the success rate meets the condition.

A system and computer program product embodying the invention are also provided.

BRIEF DESCRIPTION OF THE DRAWINGS

The invention will be understood and appreciated more fully from the following detailed description taken in conjunction with the appended drawings in which:

FIG. 7 is a simplified block diagram illustration of an exemplary hardware implementation of a computing system, constructed and operative in accordance with an embodiment of the invention.

DETAILED DESCRIPTION OF THE INVENTION

Figure 1:
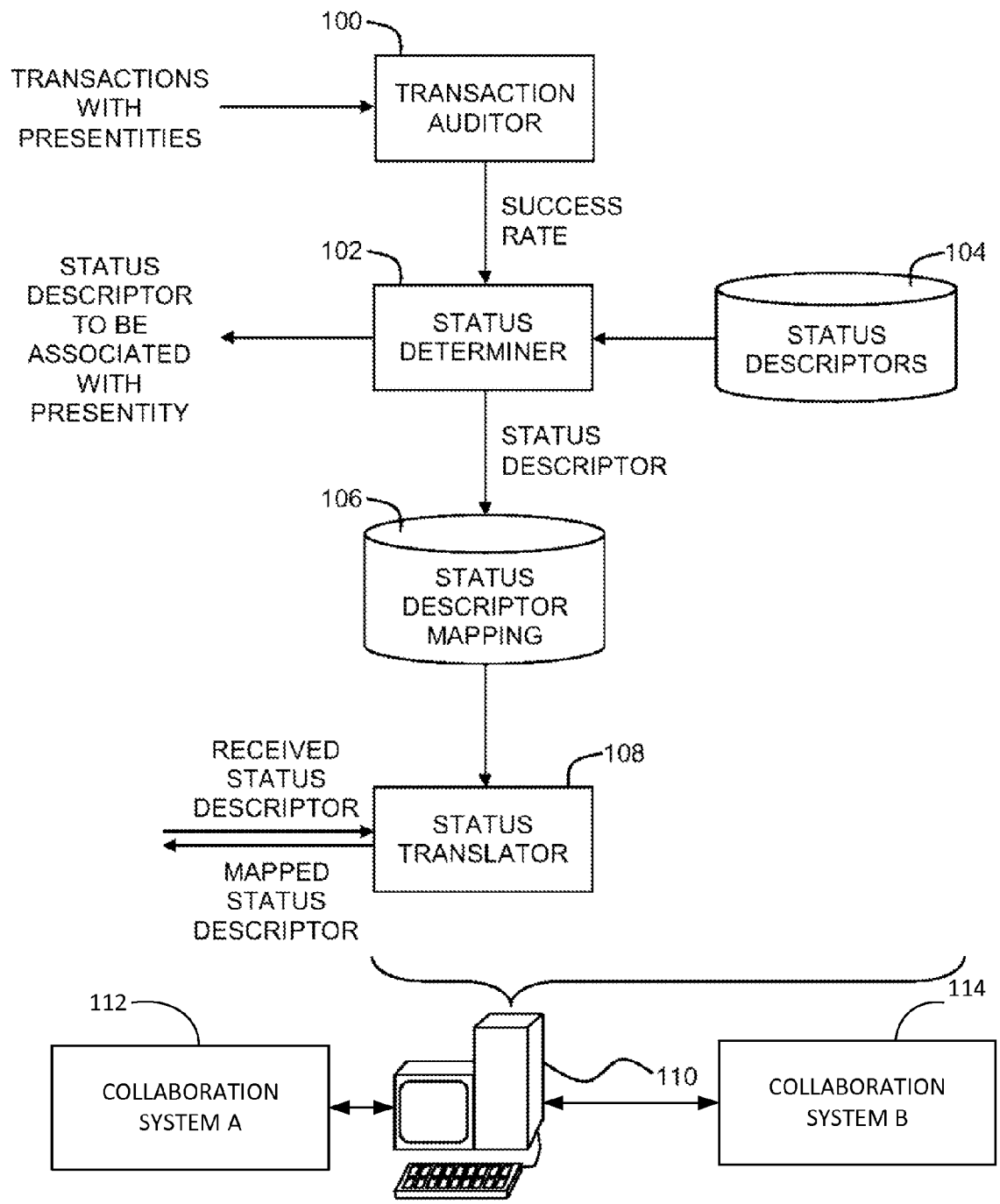
FIG. 1 is a simplified conceptual illustration of a system for status determination in computer network-based communications systems, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for determining status in a computer network-based communications system, constructed and operative in accordance with an embodiment of the invention. In the system of FIG. 1, a transaction auditor 100 is configured to determine the success rate for transactions of the same transaction type, such as chat requests or file transfers, that are initiated by one or more entities in a first computer network-based communications system in one or more transaction requests sent to a second computer network-based communications system, where the transactions relate to a specific entity associated with the second system. For example, transaction auditor 100 may determine the success rate for chat requests that are initiated by members of a collaboration system A 112, such as IBM Lotus Sametime™, commercially-available from International Business Machines Corporation, Armonk, N.Y., and sent to a member of a collaboration system B 114, such as Yahoo Messenger™, commercially-available from Yahoo! Inc., Sunnyvale, Calif. An entity whose status is determined as described herein is now referred to as a "presentity" to distinguish from entities that initiate transactions with the presentity.

A status determiner 102 is configured to identify a status descriptor that has a predefined association with the transaction type for which a success rate has been determined as described above, as well as a condition that has a predefined association with the identified status descriptor and the transaction type. Thus, continuing with the previous example, status determiner 102 may identify the status descriptor "ONLINE" as being associated with chat request transactions, as well as identify the condition that to receive the status of "ONLINE", a presentity requires a chat request success rate of >=70%. Predefined associations between status descriptors, transaction types, and conditions may be maintained in a status descriptor data store 104, such as may be predefined for use with collaboration system A.

Status determiner 102 is configured to associate a status descriptor with a presentity if the success rate determined for a transaction type with regard to the presentity meets the condition associated with the status descriptor and the transaction type. Continuing with the previous example, if the success rate of chat requests made by members of collaboration system A to the presentity of collaboration system B is 84%, and the status descriptor "ONLINE" is associated with chat requests, and the condition associated with the status descriptor "ONLINE" and chat requests requires a chat request success rate of >=70%, then status determiner 102 may associate the status descriptor "ONLINE" with the presentity. The status descriptor associated with the presentity may be made known to members of collaboration system A in accordance with conventional techniques.

A status descriptor that is associated with a presentity as described hereinabove may replace a different status descriptor that was previously associated with the presentity. Thus, continuing with the previous example, if the current status of the presentity of collaboration system B, as previously communicated by to collaboration system A, is "STANDBY", and status determiner 102 determines that the condition associated with the status descriptor "ONLINE" and the chat request transaction type is met with regard to the presentity, then status determiner 102 may replace the presentity's current "STANDBY" status descriptor with the "ONLINE" status descriptor. A status descriptor mapping 106 is preferably maintained, such as for use with collaboration system A, of status descriptors that have replaced other status descriptors, where for each status descriptor that is replaced in the manner described hereinabove, status descriptor mapping 106 records the replaced status descriptor, the identity of the system that provided the replaced status descriptor, and the status descriptor that replaced it. Thereafter, a status translator 108 preferably translates status descriptors that are received from a system into other status descriptors where a mapping exists for the received status descriptor in status descriptor mapping 106. Thus, continuing with the previous example, once the "STANDBY" status descriptor of collaboration system B has been replaced with the "ONLINE" status descriptor of collaboration system A for the presentity in the manner described hereinabove, thereafter any time the "STANDBY" status descriptor is sent by collaboration system B to collaboration system A regarding a presentity of collaboration system B, status translator 108 may automatically translate the "STANDBY" status descriptor to the "ONLINE" status descriptor without having to first determine transaction success rates for the presentity as described hereinabove.

Any of the elements shown in FIG. 1 are preferably implemented by one or more computers, such as a computer 110, by implementing any of the elements shown in FIG. 1 in computer hardware and/or in computer software embodied in a non-transient, computer-readable medium in accordance with conventional techniques.

Figure 2:
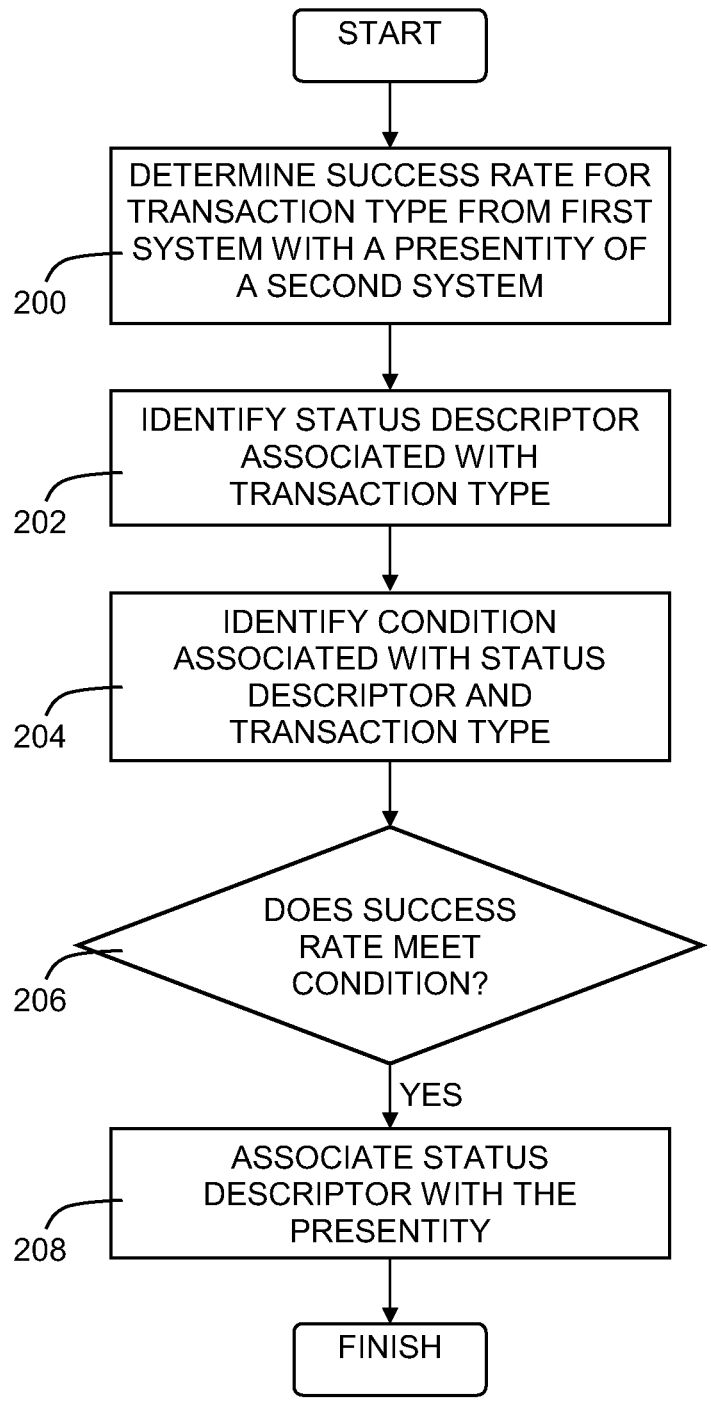
FIGS. 2-6 are simplified flowchart illustrations of exemplary methods of operation of the system of FIG. 1, operative in accordance with multiple embodiments of the invention.

Reference is now made to FIG. 2 which is a simplified flowchart illustration of an exemplary method of operation of the system of FIG. 1, operative in accordance with an embodiment of the invention. In the method of FIG. 2, a success rate is determined for multiple transactions of the same transaction type that are initiated by one or more entities in a first computer network-based communications system in multiple corresponding transaction requests sent to a second computer network-based communications system, where the transactions relate to a presentity associated with the second computer network-based communications system (step 200). A status descriptor is identified that has a predefined association with the transaction type (step 202). A condition that has a predefined association with the status descriptor and the transaction type is identified (step 204). If the success rate meets the condition (step 206), the status descriptor is associated with the presentity (step 208).

Figure 3:
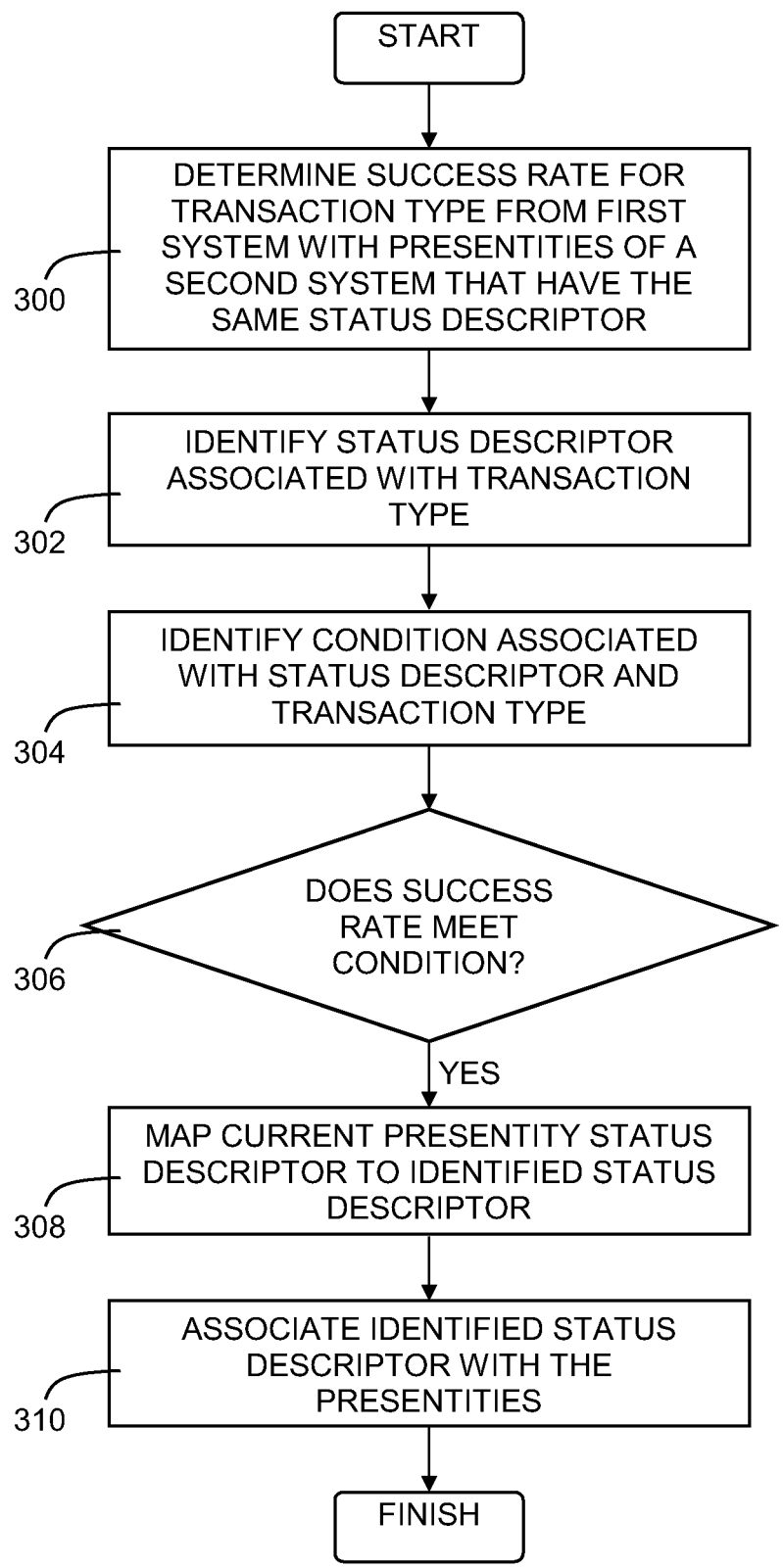

Reference is now made to FIG. 3 which is a simplified flowchart illustration of an exemplary method of operation of the system of FIG. 1, operative in accordance with an embodiment of the invention. The method of FIG. 3 differs from the method of FIG. 2 in that in FIG. 2 the success rate is determined with respect to one presentity and without regard to the presentity's current status, whereas in FIG. 3 the success rate is determined with respect to one or more presentities having the same status. In the method of FIG. 3, a success rate is determined for multiple transactions of the same transaction type that are initiated by one or more entities in a first computer network-based communications system in multiple corresponding transaction requests sent to a second computer network-based communications system, where the transactions relate to one or more presentities associated with the second computer network-based communications system, and where the presentities are known to the first system to be associated with the same status descriptor (step 300). A status descriptor is identified that has a predefined association with the transaction type (step 302). A condition that has a predefined association with the status descriptor and the transaction type is identified (step 304). If the success rate meets the condition (step 306), the status descriptor associated with the presentities is mapped for future reference to the status descriptor identified in step 302 (step 308), and the status descriptors associated with the presentities are replaced with the status descriptor identified in step 302 (step 310).

Figure 4:
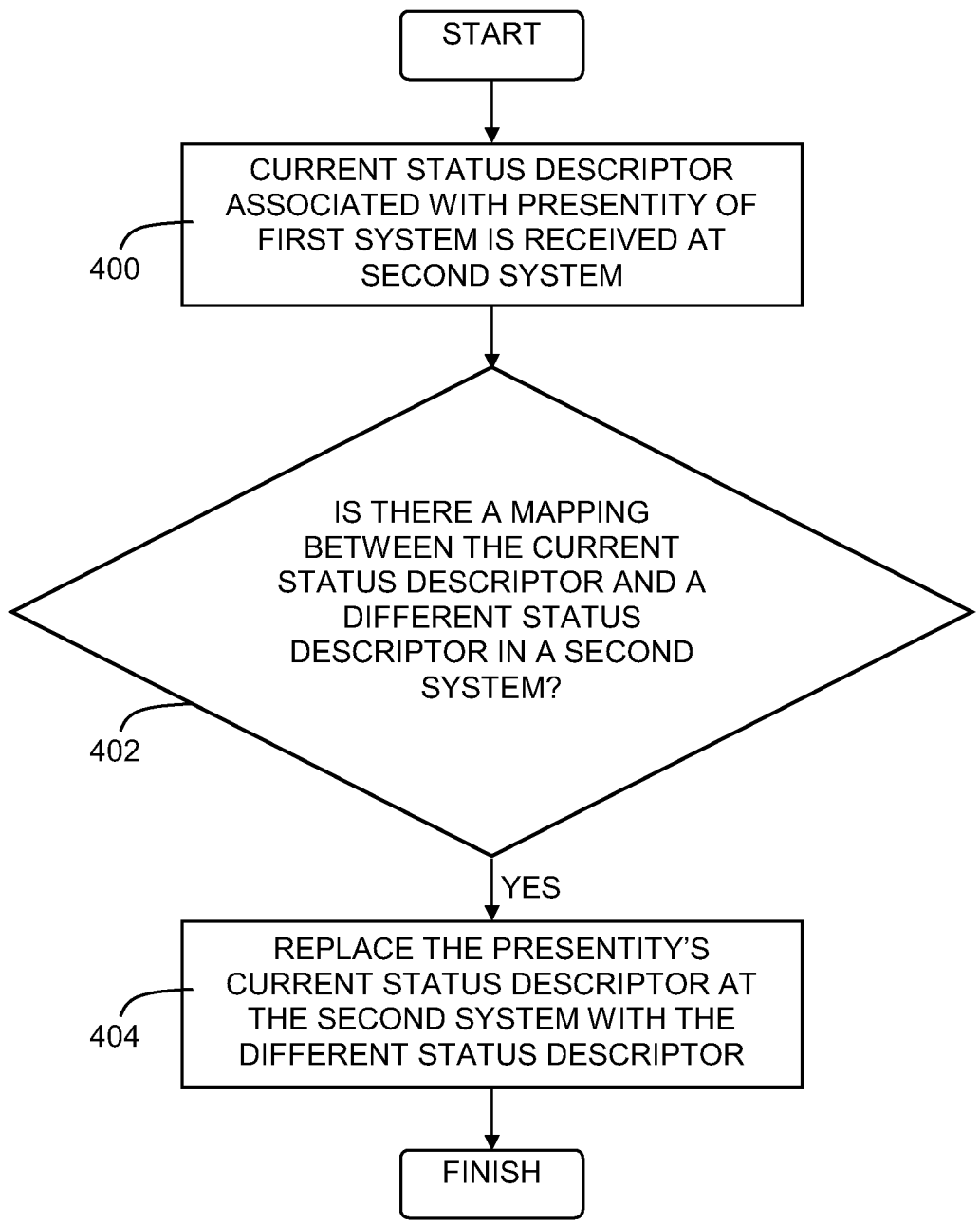

Reference is now made to FIG. 4 which is a simplified flowchart illustration of an exemplary method of operation of the system of FIG. 1, operative in accordance with an embodiment of the invention. In the method of FIG. 4, a status descriptor associated with a presentity of a first computer network-based communications system is received at a second computer network-based communications system (step 400). If a mapping exists between the received status descriptor and a different status descriptor associated with the second system (step 402), then the received status descriptor associated with the presentity is replaced with the different status descriptor (step 404).

Figure 5:
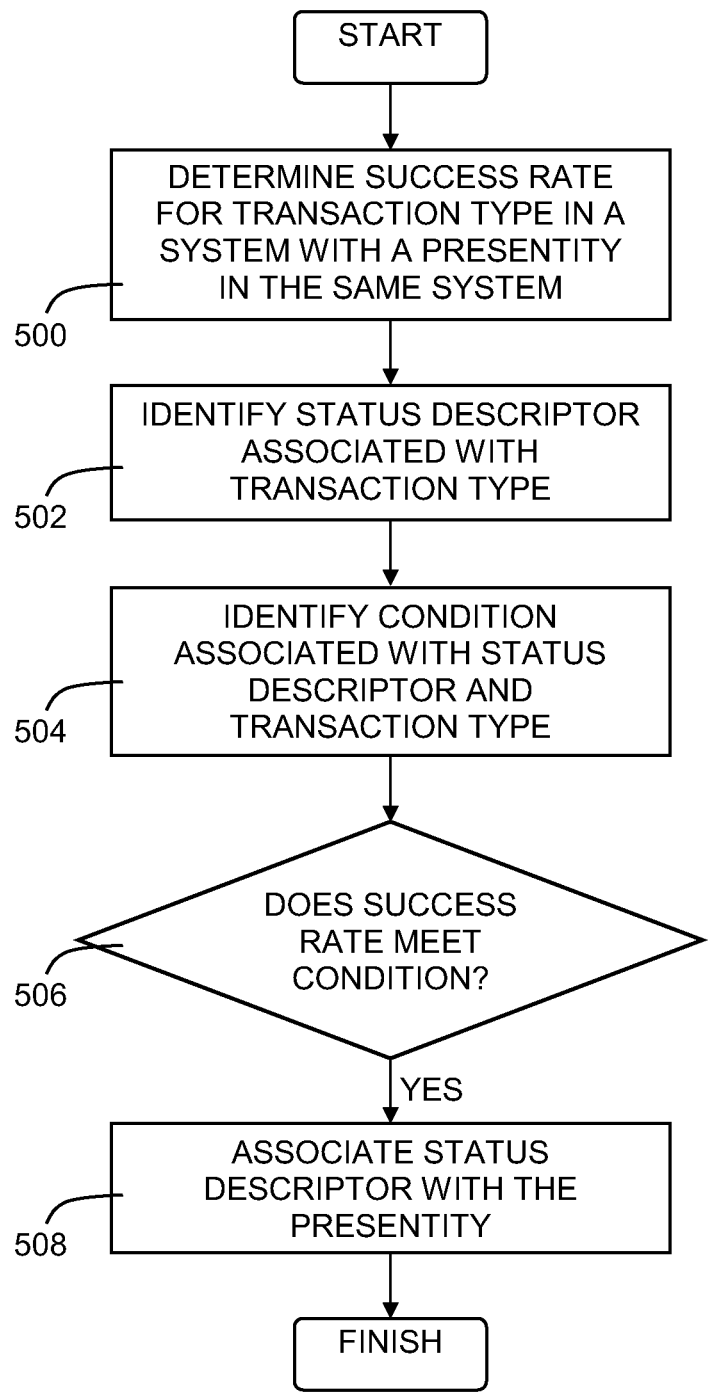

Reference is now made to FIG. 5 which is a simplified flowchart illustration of an exemplary method of operation of the system of FIG. 1, operative in accordance with an embodiment of the invention. The method of FIG. 5 differs from the method of FIG. 2 in that in FIG. 2 the success rate is determined with respect to transaction requests originating in one system regarding a presentity in another system, whereas in FIG. 5 the success rate is determined with respect to transaction requests originating in a system regarding a presentity in the same system. In the method of FIG. 5, a success rate is determined for multiple transactions of the same transaction type that are initiated by one or more entities in a computer network-based communications system in multiple corresponding transaction requests, where the transactions relate to a presentity within the same system (step 500). A status descriptor is identified that has a predefined association with the transaction type (step 502). A condition that has a predefined association with the status descriptor and the transaction type is identified (step 504). If the success rate meets the condition (step 506), the status descriptor is associated with the presentity (step 508).

Figure 6:
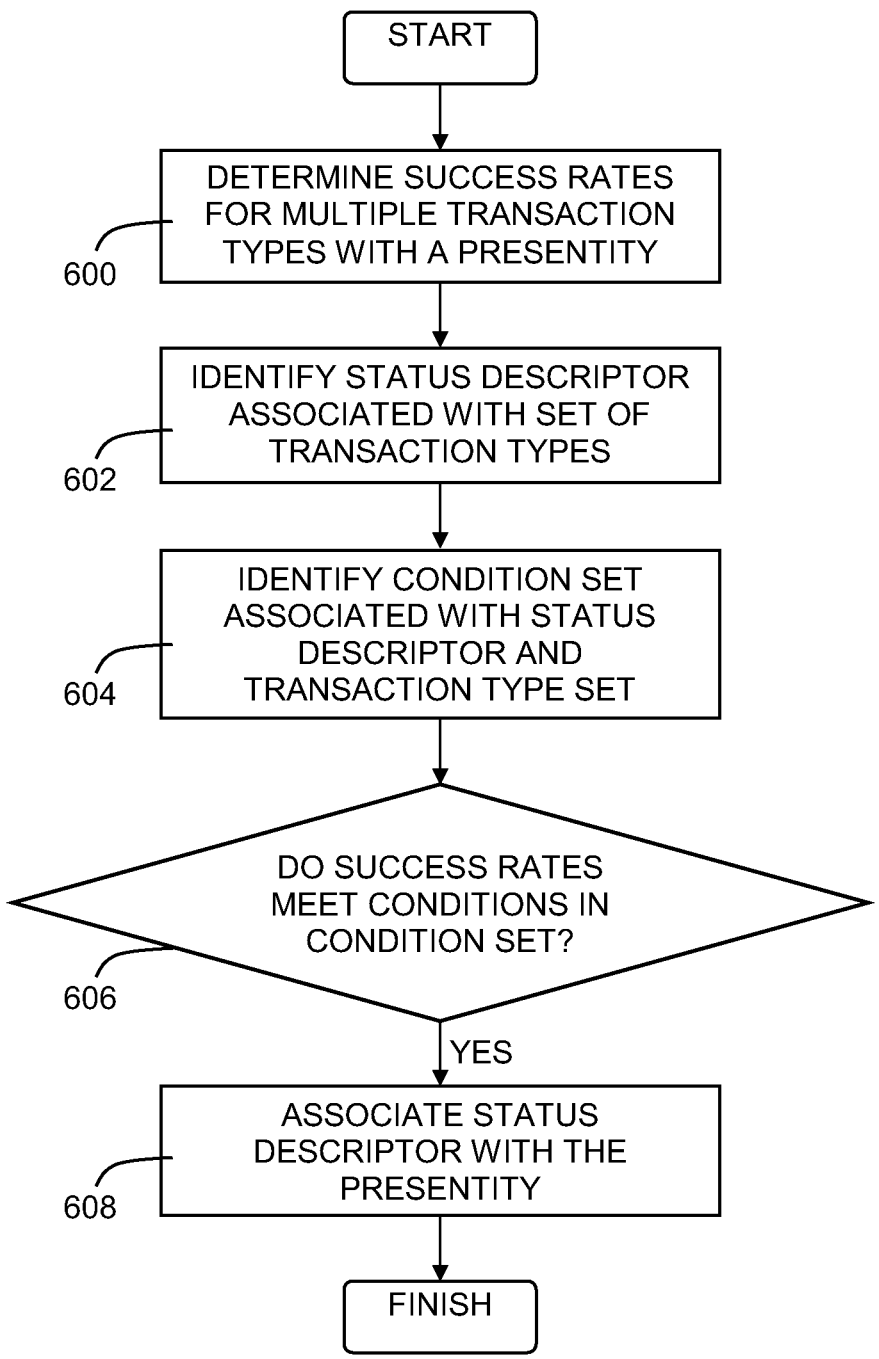

Reference is now made to FIG. 6 which is a simplified flowchart illustration of an exemplary method of operation of the system of FIG. 1, operative in accordance with an embodiment of the invention. The method of FIG. 6 differs from the method of FIG. 2 in that in FIG. 2 a single success rate is determined with respect to transaction requests of a single transaction type, whereas in FIG. 6 multiple success rates are determined with respect to transaction requests representing a set of multiple transaction types that is associated with a status descriptor and a condition set. The methods of FIGS. 2-5 may be adapted to incorporate the multiple success rates of FIG. 6. In the method of FIG. 6, multiple success rates are determined for multiple transactions of the multiple transaction types that are initiated by one or more entities in a computer network-based communications system in multiple corresponding transaction requests, where the transactions relate to a presentity (step 600). A status descriptor is identified that has a predefined association with a set of the transaction types (step 602). A condition set that has a predefined association with the status descriptor and the set of transaction types is identified (step 604). If a set of the success rates meets the condition set (step 606), the status descriptor is associated with the presentity (step 608).

Referring now to FIG. 7, block diagram 700 illustrates an exemplary hardware implementation of a computing system in accordance with which one or more components/methodologies of the invention (e.g., components/methodologies described in the context of FIGS. 1-6) may be implemented, according to an embodiment of the invention.

As shown, the techniques for controlling access to at least one resource may be implemented in accordance with a processor 710, a memory 712, I/O devices 714, and a network interface 716, coupled via a computer bus 718 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer implemented method for determining a status of a presentity, the method comprising:
   determining, by a translation auditor of the computer, an initiation of a transaction of a transaction type by an entity in a first collaboration system related to the presentity in a second collaboration system;
   determining, by the transaction auditor, a success rate for a plurality of transactions of the transaction type initiated from the first collaboration system to the second collaboration system;
   determining, by a status determiner of the computer, a status descriptor specific to the first collaboration system with a predefined association with the transaction type;
   determining, by the status determiner, a condition with a predefined association with the status descriptor specific to the first collaboration system and the transaction type, wherein the condition comprises a threshold success rate with regard to the presentity;
   determining, by the status determiner, whether the success rate for the plurality of transactions of the transaction type meets the threshold success rate of the condition;
   determining, by the status determiner, a current status descriptor for the presentity is sent from the second collaboration system to the first collaboration system, the current status descriptor being specific to the second collaboration system; and
   in response to determining that the success rate for the plurality of transactions of the transaction type meets the threshold success rate, replacing, by a status translator of the computer, the current status descriptor for the presentity with the status descriptor specific to the first collaboration system for use in the first collaboration system.

2. The method of claim 1, wherein determining of the success rate for the plurality of transactions of the transaction type initiated from the first collaboration system to the second collaboration system comprises:
   determining that the plurality of transactions related to a plurality of presentities associated with the second collaboration system and that the plurality of presentities are known to the first collaboration system to be associated with the same status descriptor; and determining the success rate for the plurality of transactions of the transaction type initiated from the first collaboration system to the second collaboration system with respect to the plurality of presentities.

3. The method of claim 1, wherein the determining of the success rate for the plurality of transactions of the transaction type comprises:
   determining a set of success rates from a set of transactions of multiple transaction types initiated from the first collaboration system to the second collaboration system, wherein the multiple transaction types have a predetermined association with the status descriptor specific to the first collaboration system; wherein the determining of the success rate for the plurality of transactions of the transaction type meets the threshold success rate of the condition comprises: determining whether the set of success rates meets the threshold success rate of the condition; and wherein the replacing of the current status descriptor for the presentity with the status descriptor specific to the first collaboration system for use in the first collaboration system comprises: in response to determining that the set of success rates meets the threshold success rate of the condition, replacing the current status descriptor for the presentity with the status descriptor specific to the first collaboration system for use in the first collaboration system.

* * * * *